United States Patent
Singhal (10) Patent No.: US 9,037,499 B2
(45) Date of Patent: May 19, 2015

(54) METHOD AND APPARATUS FOR AN ONLINE SUBSCRIPTION SYSTEM

(76) Inventor: Tara Chand Singhal, Torrance, CA (US)

( * ) Notice: Subject to any disclaimer, the term of this patent is extended or adjusted under 35 U.S.C. 154(b) by 3261 days.

(21) Appl. No.: 10/100,380

(22) Filed: Mar. 18, 2002

(65) Prior Publication Data

US 2002/0096563 A1     Jul. 25, 2002

Related U.S. Application Data

(60) Provisional application No. 60/255,002, filed on Dec. 9, 2000, provisional application No. 60/270,750, filed on Feb. 21, 2001.

(51) Int. Cl.

| | |
|---|---|
| G06Q 30/00 | (2012.01) |
| G07F 7/10 | (2006.01) |
| G06Q 20/02 | (2012.01) |
| G06Q 20/04 | (2012.01) |
| G06Q 20/10 | (2012.01) |
| G06Q 20/14 | (2012.01) |
| G06Q 20/20 | (2012.01) |

(Continued)

(52) U.S. Cl.
CPC .............. *G07F 7/1008* (2013.01); *G06Q 20/02* (2013.01); *G06Q 20/023* (2013.01); *G06Q 20/04* (2013.01); *G06Q 20/10* (2013.01); *G06Q 20/102* (2013.01); *G06Q 20/14* (2013.01); *G06Q 20/204* (2013.01); *G06Q 20/24* (2013.01); *G06Q 20/32* (2013.01); *G06Q 20/322* (2013.01); *G06Q 20/3224* (2013.01); *G06Q 20/3276* (2013.01); *G06Q 20/3415* (2013.01); *G06Q 20/382* (2013.01); *G06Q 20/383* (2013.01); *G06Q 20/385* (2013.01); *G06Q 20/401* (2013.01); *G06Q 20/4012* (2013.01); *G06Q 20/4014* (2013.01); *G06Q 20/403* (2013.01); *G06Q 30/02* (2013.01); *G06Q 30/0601* (2013.01); *G07F 19/203* (2013.01)

(58) Field of Classification Search
CPC .................................................. G06Q 30/0601
USPC ................. 705/26, 27, 26.1, 27.1, 26.42, 325
See application file for complete search history.

(56) References Cited

U.S. PATENT DOCUMENTS

| | | | |
|---|---|---|---|
| 5,220,501 A | 6/1993 | Lawlor et al. | |
| 6,473,739 B1 * | 10/2002 | Showghi et al. | ................. 705/26 |

(Continued)

FOREIGN PATENT DOCUMENTS

| | | |
|---|---|---|
| DE | 19903363 A | 8/2000 |
| EP | 0910 028 A | 4/1999 |

(Continued)

OTHER PUBLICATIONS

"Wireless subscribers can expect new data options" Palenchar, Joseph. TWICE 14.26 ( Nov. 15, 1999).*

*Primary Examiner* — Courtney Stopp
(74) *Attorney, Agent, or Firm* — Steve Roeder (57) ABSTRACT

An online subscription service system for subscription merchants that facilitates efficient payment from a subscription customer for a subscription described on a merchant web page, without providing personal sensitive data to employees of the merchant. The online subscription system includes a central system, a portable wireless device, a card processor and a merchant system and a web page with a service code that identifies the merchant and the particular service.

17 Claims, 5 Drawing Sheets

(51) Int. Cl.
*G06Q 20/24* (2012.01)
*G06Q 20/32* (2012.01)
*G06Q 20/34* (2012.01)
*G06Q 20/38* (2012.01)
*G06Q 20/40* (2012.01)
*G06Q 30/02* (2012.01)
*G06Q 30/06* (2012.01)
*G07F 19/00* (2006.01)

(56) References Cited

U.S. PATENT DOCUMENTS

| | | |
|---|---|---|
| 6,587,835 B1 | 7/2003 | Treyez et al. |
| 6,941,286 B1 | 9/2005 | Foth |
| 7,240,035 B1 * | 7/2007 | Engstrom ................. 705/74 |
| 7,251,617 B1 * | 7/2007 | Walker et al. .............. 705/16 |
| 2002/0002498 A1 * | 1/2002 | Hatakeyama ............... 705/26 |
| 2002/0046080 A1 * | 4/2002 | Loeb et al. ................. 705/10 |
| 2002/0059114 A1 * | 5/2002 | Cockrill et al. ............. 705/27 |
| 2002/0065074 A1 * | 5/2002 | Cohn et al. ................ 455/422 |
| 2002/0107985 A1 * | 8/2002 | Hwang et al. ............. 709/246 |
| 2003/0167202 A1 * | 9/2003 | Marks et al. ............... 705/14 |
| 2003/0208442 A1 * | 11/2003 | Cockrill et al. ............. 705/40 |
| 2005/0216824 A1 * | 9/2005 | Ferguson et al. .......... 715/501.1 |

FOREIGN PATENT DOCUMENTS

| | | | |
|---|---|---|---|
| EP | 1093097 A | 4/2001 | |
| WO | WO 97/45814 A | 12/1997 | |
| WO | WO0169903 A1 * | 9/2001 | ............. H04M 3/42 |

* cited by examiner

METHOD AND APPARATUS FOR AN ONLINE SUBSCRIPTION SYSTEM

CROSS REFERENCE TO RELATED APPLICATIONS

This application is related to and claims priority on Provisional Application Ser. No. 60/255,002, entitled "Method and Apparatus for an Integrated Identity Security and Payment System," filed on Dec. 9, 2000, by Tara Chand Singhal.

This application is also related to and claims priority on Provisional Application Ser. No. 60/270,750, filed Feb. 21, 2001, entitled "Method and Apparatus for an Integrated Identity Security and Payment System," by Tara Chand Singhal.

This application is also related to and claims priority on U.S. application Ser. No. 10/014,040, filed Dec. 10, 2001, entitled "Method and Apparatus for an Integrated Identity Security and Payment System," by Tara Chand Singhal.

The contents of Application Ser. Nos. 60/255,002, Dec. 9, 2000, 60/270,750 Feb. 21, 2001 and Ser. No. 10/014,040 are incorporated herein by reference.

FIELD OF THE INVENTION

The present invention is directed to a method and apparatus for a system that facilitates receiving an online subscription service without providing personal sensitive data to merchant employees and merchant computer systems.

BACKGROUND

Typically, at a subscription merchant website, the customer selects the subscription, pays for it and selects or receives a password to access the service. The subscription service may be for a trial period with trial rates or for a longer period, for example, with periodic payments such as monthly or every three months. Examples of such subscription service merchants are those having business intelligence data making available to other businesses, adult sites making mature content available to customers, and online magazines and newspapers, making value added news available to business and consumers.

While making payment for such a subscription service, the customer gives his/her name, credit card number to the merchant along with other data such as e-mail address, so that the merchant can process the payment for initial payment and for subsequent periodic payments and notify the customer via the e-mail address.

The customer sensitive data resides in the merchant computer system, sometimes becoming permanently saved data, even after the customer has ceased to be the subscription customer. The sensitive data is subject to theft by hacking as well as subject to misuse in being shared or sold to other businesses. Theft by hacking and misuse of data are common occurrences based on many published news stories.

In light of the above, it is an objective of the present invention to provide an apparatus and method that facilitates receiving an online subscription service without providing sensitive information to the merchant and merchant employees.

Yet another objective is to remove from the merchant the responsibility and liability of safeguarding sensitive data of others.

SUMMARY

The present invention is directed to an online subscription service system that facilitates receiving an online subscription service without providing personal sensitive data to merchant employees and merchant computer systems.

A customer can pay for the online subscription service and receive the service by use of a password without providing any personal data to the merchant. Hence a customer does not provide name, e-mail address, credit card data, or any other personal data to the subscription merchant in order to receive the subscription service.

The system includes a central system, a portable wireless device, a card processor, a subscription merchant website describing a subscription service included with a service code, and a merchant computer system. The service code is composed of a merchant number and a service number.

After having reviewed the website and made a decision to purchase subscription service the customer using the wireless device connects to a secure web connection with the central system and is presented a data card. From this data card, the customer selects from Account, Start, Cancel and Retrieve and is presented corresponding data cards. By using Start, customer can identify a service by its service code and start the subscription service, by using Account, can open an account, by using Cancel can cancel a service and by using Retrieve, can check the status of the service including the activated password for accessing the service.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 3A-B is a block diagram that illustrates some of the data having features of the present invention;

DESCRIPTION

Introduction

The present invention is directed to an online subscription service system that facilitates receiving a subscription service without providing customer personal sensitive data to merchant employees and merchant computer systems.

Figure 1:
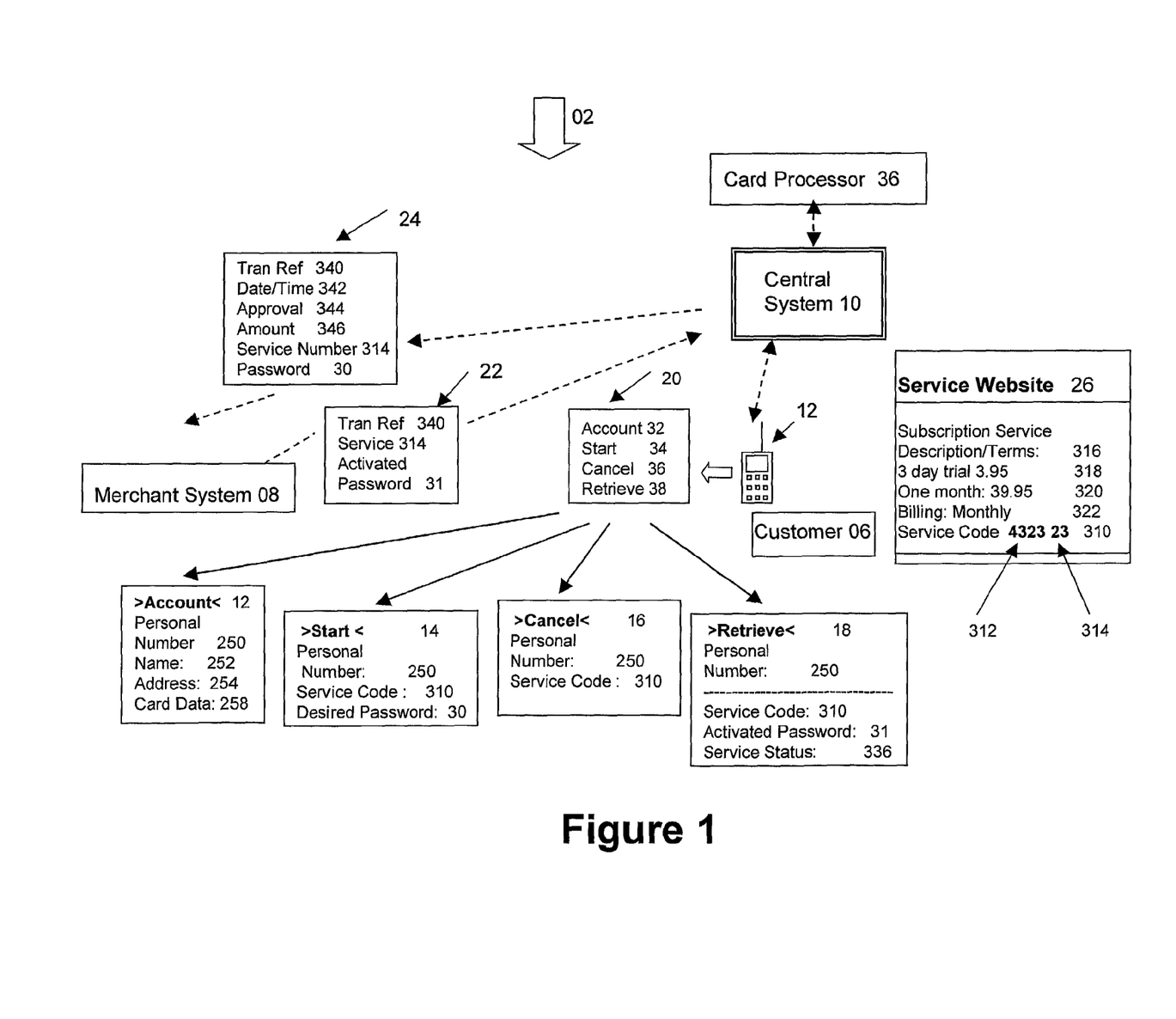
FIG. 1 is a block diagram that illustrates features of the present invention online subscription service system between a subscription service customer and a merchant.

With initial reference to FIG. 1, the online subscription system 02 includes a central system 10, a web-enabled portable wireless device 12, and a card processor 36. A subscription merchant website 26 is accessible to the customer 06, identifying and describing the different subscription choices in terms of content 316 and different pricing 318, 320, 322, and a service code 310. The service code 310 is composed of a merchant number 312 and service number 314. Alternatively, the service code may be only one number or code that uniquely identifies both the merchant and the service in a relational database.

The central system 10 stores and/or can readily access merchant data including merchant ID and personal data of a customer including information regarding one or more bank accounts of the customer.

After having reviewed the website 26, and made a decision to purchase subscription service, the customer 06 using device 12 connects to a secure web connection with the system 10 and is presented a data card 20. From this data card 20, the customer 06 selects from Account 32, Start 34, Cancel 36 and Retrieve 38 and is presented data cards 12, 14, 16 and 18 respectively. By using Start card 14, customer 06 can start a subscription service by specifying desired password 30. By using Account card 12, can open an account. By using Cancel card 16 can cancel a service and by using Retrieve card 18, can check the status of the service including the activated password 31 for accessing the service.

The desired password 30 is what a customer desires the password to be, the activated password 31 is what the merchant has enabled the particular service for access. For example, the desired password 30 may be Jeff and the activated password may be Jeff999.

The central system 10 with the pre-stored data of the merchant and customer and using the card processor 36 processes the payment. After the approval of the payment transaction is received from the card processor 36, the central system 10 sends to the merchant system 08 a data record 24 showing the payment has been successfully processed and the customer desired password 30 to access the service number 314, and awaits a response record 22 for the service activation and confirmation of the activated password 31. After the central system 10 receives the response record 22, it updates the billing table 242B with the activated password 31 and status 336 as Active (described later with reference to FIGS. 4 and 5).

The customer 06 by using Retrieve card 18 retrieves the service status 336 and activated password 31, permitting him/her to access the service.

Thus a customer can receive an online subscription service and cancel the service without disclosing any time any personal data to the merchant such as name, e-mail address and bankcard data.

These and other aspects of the invention are described herein, where the headings are provided for the convenience of the reader.

Device 12

The device 12 may be a web-enabled cellular telephone with a screen and a keypad. Alternatively, it may be personal digital assistant (PDA) with a wireless modem, which also has a display screen and a soft keypad.

Alternatively the device 12 may be a web-enabled computer that may be connected via landlines via a global computer network to the central system 10

Central System 10

Figure 2:
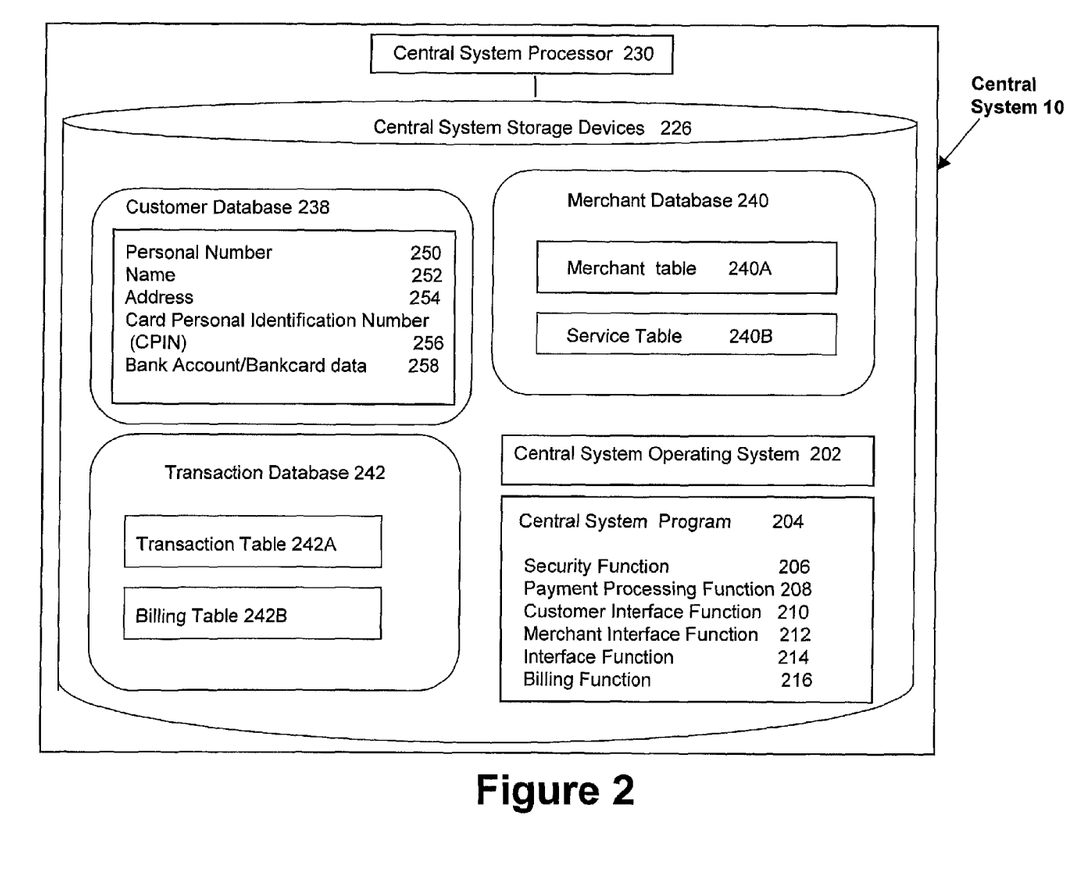
FIG. 2 is a block diagram that illustrates a central system having features of the present invention.

Referring to FIG. 2, the central system 10 includes (i) a system storage device 226, (ii) a system operating system 202 stored in the system storage device 226, (iii) a system program 204 stored in the system storage device 226, (iv) and a system processor 230 connected to the system storage device 226.

The system processor 230 can include one or more conventional CPU's. The system processor 230 can be capable of high volume processing and database searches.

The system storage device 226 can, for example, include one or more magnetic disk drives, magnetic tape drives, optical storage units, CD-ROM drives and/or flash memory. The system storage device 226 also contains a plurality of databases used in the processing of transactions pursuant to the present invention. For example, as illustrated in FIG. 2, the system storage device 226 can include a merchant database 240, a customer database 238 and a transaction database 242.

The system 10 includes a system network interface (not shown) that allows the system 10 to communicate with the customer 06 and the merchant 08 and the card processor 36. Conventional internal or external modems may serve as the system network interface. In one embodiment, the system network interface is connected to the customer, merchant and the card processor on a global network.

A merchant network interface (not shown) allows the merchant 08 to communicate with the system 10. Conventional internal or external modems may serve as the merchant network interface. In one embodiment, the merchant network interface is connected to the system 10 on the global network.

A customer network interface (not shown) allows the customer to communicate with the system 10. Conventional internal or external modems may serve as the customer network interface. In one embodiment, the customer network interface is connected to the system 10 on the global network.

The system 10 interfaces with a card processor 36 representing a bankcard authorization network. The bankcard authorization network is a computer system that process payments from bankcards using an automated clearing house to process payments between banks.

The system processor 230 is operative with the system program 204 to perform a Security Function 206, a Payment Processing Function 208, a Customer Interface function 210, a Merchant Interface function 212, an Interface function 214, and a Billing function 216.

Customer Database 238

With reference to FIG. 2, the customer database 238 within the central system 10 contains private data specifically related to the customer 06 that is transferred to the system 10 from the customer.

The customer database 238 requires from the customer 06 and saves data that is minimally necessary to receive an online subscription service. The minimum data considered necessary to process the payment with a card processor is Name, address and card data. In addition a personal number and an optional CPIN are used to identify and verify the customer including the particular bankcard he wishes to use for a payment transaction.

This database contains the personal number 250 and Bank account data of name 252, address 254 and card number 258. The telephone number of the wireless device may serve as the personal number 250. Alternatively, it may be any other number that the customer 06 finds easy to remember. Optional card personal identification number (CPIN) 256 may be used to identify one of many cards that the customer wishes to use for a payment. Multiple CPIN and bank account data for each customer may be maintained allowing a customer to use any one of his/her accounts whether they are checking accounts, debit card accounts or credit card accounts.

No other data even including e-mail address is required or necessary in this invention. The customer connects to the system 10 and using Retrieve 38, accesses the status of his account and activated password. Hence, the customer data does not include e-mail address and no means exist for the system to contact the customer, assuring him/her complete confidence in not making his personal data available to others.

Merchant Database 240

Figure 3A:
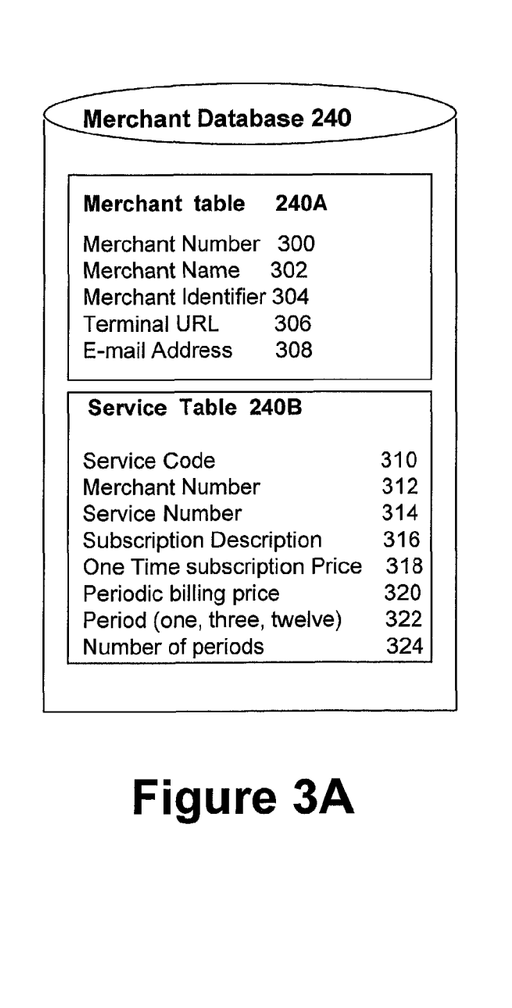

With reference to FIG. 2, this database maintains data on the merchants who use the system 02 in the form of a merchant table 240A and a service table 240B. With reference to FIG. 3A, the merchant table 240A maintains data on each of the merchant as merchant number 300, merchant name 302, a URL 306, a merchant identification 304, and e-mail address 308.

Merchant ID 304 is an existing ID of the merchant that is used to process his card transactions with an existing card processor. URL 306 is the uniform resource locater on the global network of merchant computer system 08, where merchant can receive the payment record 24 from the central system 10. Alternatively, via e-mail address 308 is where he can receive record 24 from the central system 10 of payment transactions.

The service table 240B maintains data on the services provided by the merchant as service Code 310, merchant Number 312, service Number 314, subscription description 316, one-time subscription price 318, periodic billing price 320, period as either one, two, three, six or 12 months 322, and number of periods 324.

Transaction Database 242

Figure 3B:
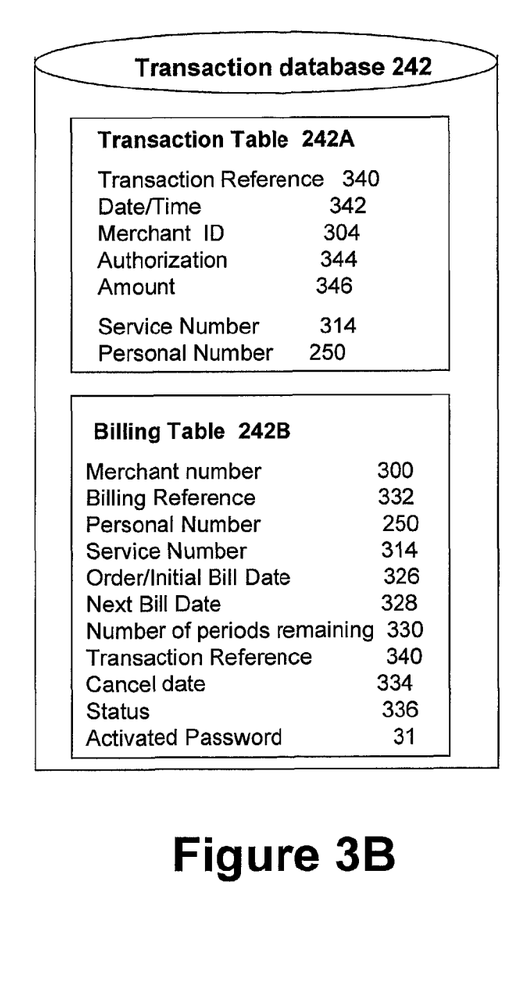

With reference to FIG. 2, this database has a transaction table 242A and a billing table 242B. With reference to FIG. 3B, the transaction table 242A logs all payment transactions with the card processor 36 by a transaction reference 340, date/time of transaction 342, merchant ID 304, amount 346, authorization code 344 received from the card processor 36, personal number 250 and additionally service number 314.

The billing table 242B maintains service status including pending periodic payment transactions by a combination of direct and computed fields. These fields are: merchant number 300, billing reference 332, personal number 250, service number 314, order/initial bill date 326, next bill date (computed field) 328, number of periods remaining (computed field) 330, transaction reference 340, cancel date 334, and status 336. The status field 336 has one of the states of Null or Active or Cancel or Expire or Declined. The logic for the change in these fields is illustrated with reference to FIGS. 4 and 5.

Merchant System 08

With reference to FIG. 1, the merchant system 08 is a prior art computer system, that is used by the merchant to store web pages 26 for display as well as process service activation on receiving payment authorizations from a card processor.

Central System Program 204

With reference to FIG. 2, the central system program 204 operates within the central system processor 230 and provides the functions of: (i) Security Function 206, (ii) Payment Processing Function 208, (iii) Customer Interface Function 210, (iv) Merchant Interface Function 212, (v) an Interface function 214, and Billing function 216. Further, the system program 204 is operated with the payment system processor 230 to perform the tasks of the central system 10 provided herein.

The Security Function 206 performs the tasks of determining and verifying from the personal number 250 and optional CPIN 256, the customer 06 and the specific bank account 258 when the customer initiates a service transaction using the wireless device 12. The system 10 is a secure server and uses encryption when communicating with the device 12 and the card processor 36.

The payment processing function 208 performs the tasks of creating payment records and notification records that are transmitted to and from the central system 10. For each payment transaction initiated by the customer via device 12 and for subsequent periodic billing, a payment record to the card processor 36 is assembled. The payment record assembles the bankcard data 258 of the customer 06, the merchant ID 304, the amount of the payment 346, and creates a transaction reference number 340 and stores in the transaction table 242A.

Details of such a payment record are prior art and are used in processing payment transactions with a prior art card-processing network. The card-processing network approves the payment and responds with an approval record containing the same data as in payment record and additionally containing an authorization or approval code and date and time of the approval.

With reference to FIG. 1, the central system 10 on receiving the payment approval record from the card processor 36 creates and sends a notification records to the merchant. The notification record 24 is sent to the merchant 08 computer system and has the transaction reference 340, date/time 342, approval Code 344, amount approved 346, service number 314, and the customer desired password 30.

The notification record 24 to merchant 08 is similar to what the merchant would have directly received from the card processor 36, if the merchant had run the payment transaction directly. The record 24 having come from the central system 10 additionally identifies the service number 314 and the desired password 30 to access the service.

On initial service activation, the record 24 identifies the desired password 30. On subsequent periodic billing of an existing service, the record 24 identifies the activated password 31, permitting the merchant to identify a previously activated service and to extend the service for the next billing period.

With reference to FIG. 1, the central system 10 provides a customer interface via device 12. The customer Interface function 210 performs the tasks of: (a) permit the customer to open an account via card 12, by entry of personal number 250, bankcard data of name 252, address 254, card number, expiration date 258, and an optional CPIN 256; (b) permit the customer to start a service via card 14 by entry of personal number 250, service code 310, desired password 30 and optional CPIN 256; (c) permit the customer to cancel a service via card 16 by entry of personal number 250 and service code 310; and (d) permit the customer to retrieve status via card 18 by entry of personal number 250 and then being presented service code 310, activated password 32 and status 336.

The customer interface 210 is web based. Alternatively, it could be voice based. The knowledge to create an interface is prior art.

The central system 10 provides a merchant interface (not shown) allowing merchant to create merchant account and enter data. The merchant Interface function 212 performs the task of permitting the merchant to open an account and enter data in merchant table 240A of merchant identification 304, merchant name 302, e-mail address 308 and URL 306 of the merchant computer system on the global network. The merchant number 300 is created or assigned by the merchant interface function 212 at the time of merchant opening the account.

The merchant Interface function 212 also performs the task of permitting the merchant to enter data in service table 240B of service number 314, subscription description 316, one time price 318, periodic billing price 320, period 322 and number of periods 323. The service code 310 is created by the merchant interface function 212 and may be composed of some combination of merchant number 300 and service number 314. Alternatively, the service code 310 is a unique number that identifies the merchant number 300 and the service number 314 in a relational database.

The merchant interface 212 is web based. Alternatively, it could be voice based. The knowledge to create an interface is prior art.

The Interface function 214 performs the tasks of (i) sending and receiving payment records from and to the prior art card processor 36; (ii) and sending and receiving notification record 24 and record 22 respectively from and to the merchant system 08.

The Billing function 216 performs the tasks of initial billing, periodic billing and maintaining service status. It uses the service table 240B that identifies all subscriptions from all merchants and billing table 242B that identifies and maintains the status of the service transactions.

Figure 4:
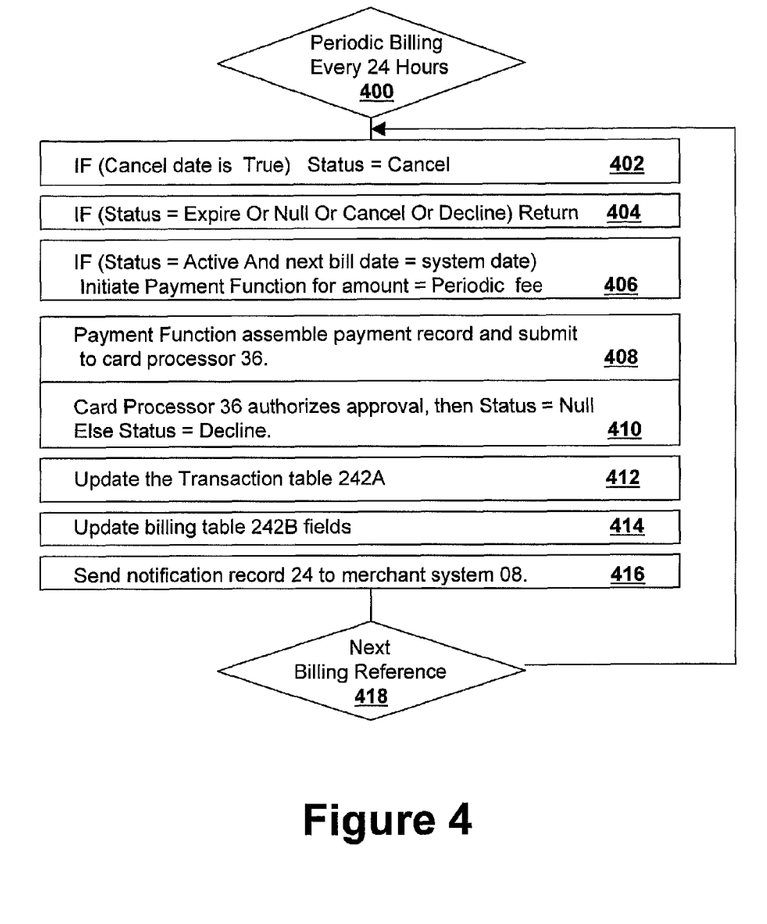
FIG. 4 is illustration of a flow diagram of a periodic billing function having features of the present invention.
Figure 5:
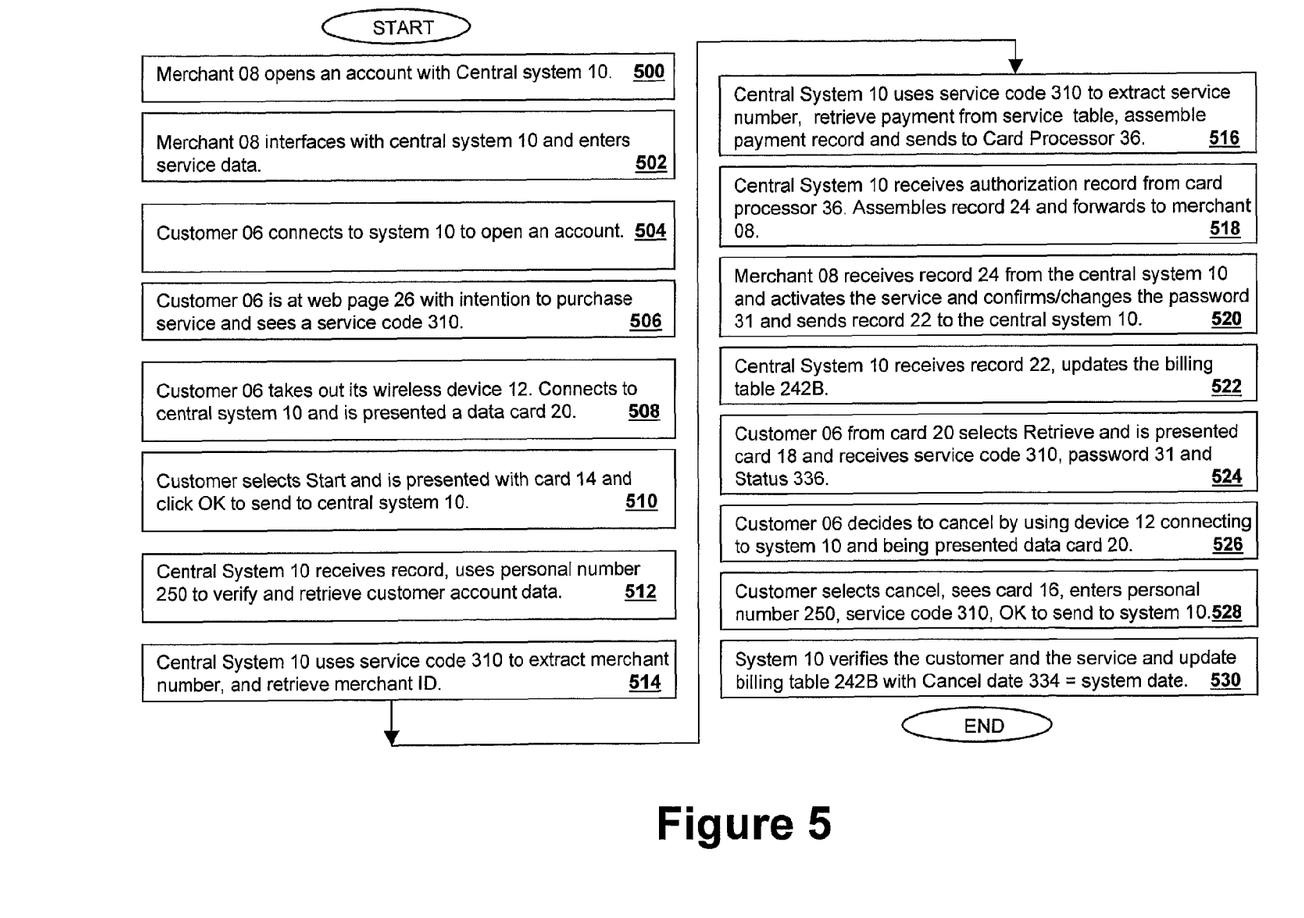
FIG. 5 is illustration of a flow diagram of an online subscription service system having features of the present invention.

The billing function is described with reference to FIGS. 4 and 5. On initial activation of the service, the transaction table 242A and the billing table 242B fields are populated. FIG. 5 describes the operation.

Subsequent to that the periodic billing function performs billing and maintains service status. At step 400, the billing function is executed every 24 hours.

At step 402 IF (Cancel date is True) Status=Cancel. The cancel date 334 is changed to system date by the customer interface program 210, when customer cancels service via the Cancel card 16.

At step 404 IF (Status=Expire Or Null Or Cancel Or Decline) Return. The status is initialized to null and changes state when service is cancelled, expires or the card payment is declined.

At step 406, IF (Status=Active And next bill date=system date) Initiate Payment Function 208 for amount=Periodic fee 320.

At step 408, Payment Function 208 assembles payment record and submits to the card processor 36.

At step 410, card processor 36 authorizes approval. If approved, Status is not changed, if declined then, Status is changed to Decline.

At step 412, Update the transaction table 242A.

At step 414, Update billing table 242B fields:next bill date=previous bill date plus days in period 322. Decrement number of periods remaining, if number of periods remaining=0, change Status=Expire.

At step 416, send notification record 24 to merchant computer system 08 with activated password 31.

At step 418, repeat for next billing reference

Operation

The operation of the apparatus 02 for the online subscription transaction between a customer and an online subscription merchant can be further understood with reference to the flow chart illustrated in FIG. 5. Importantly, the order of some or all of the steps can be varied. Further, not all of the steps outlined below may be necessary to perform a service transaction pursuant to the present invention.

At Step 500 Merchant 08 opens an account with Central system 10 with a merchant number 300 and providing merchant ID 304, merchant name 302, URL 306, and e-mail address 308.

At Step 502 Merchant 08 interfaces with central system 10 and enters Service data including service number 314, subscription description 316 and subscription fee detail 318-324 in service table 240B.

At Step 504 Customer 06 connects to system 10, presented data 20, selects Account 32, sees card 12, enters personal number 250, and data 252, 254, 258 to open an account.

At Step 506 Customer 06 is at web page 26 with intention to purchase service and sees a service code 310.

At Step 508 Customer 06 takes out its wireless device 12. Connects to central system 10 and is presented a data card 20.

At Step 510 Customer selects Start 34 from data card 20 and is presented with start card 14. Enters personal number 250, service code 310, desired password 30 and click OK to send to central system 10.

At Step 512 Central System 10 receives card 14, uses personal number 250 to verify and retrieve customer account data 258.

At Step 514, Central System 10 uses service code 310 to extract merchant number 300, and retrieve merchant ID 304.

At Step 516 Central System 10 uses service code 310 to extract service number 314, retrieve payment amount 318 from service table 240B, assemble payment record and sends to Card Processor 36.

At Step 518 Central System 10 receives authorization record from card processor 36. Assembles record 24 including desired password 30 and forwards to merchant system 08.

At Step 520 Merchant 08 receives record 24 from the central system 10 and activates the service and confirms/changes to activated password 31 and sends record 22 to the central system 10.

At Step 522 Central System 10 receives record 22, updates the billing table 242B with activated password 31 and the service status 336 as Active.

At Step 524 Customer 06 from data card 20 selects Retrieve 38 and is presented Retrieve card 18. Enters personal number 250 and Clicks OK and receives service code 310, activated password 31 and Status 336.

At Step 526 Customer 06 decides to cancel by using device 12 connecting to system 10 and being presented data card 20.

At Step 528 Customer selects cancel 36, sees cancel card 16, enters personal number 250, service code 310 and OK to send to system 10.

At Step 530, the system 10 verifies the customer and the service and updates billing table 242B with cancel date 334 equal to system date.

In summary, the online subscription system 02 allows an online subscription service merchant 08 to receive payments from a subscription customer 06 and allows customer 06 to receive subscription service with activated password 31, without the customers using and disclosing their personal data to employees of the merchant and merchant computer system. Thus the online subscription system 02 provides efficient, private and secure service transactions.

While the particular apparatus 02 as illustrated herein and disclosed in detail is fully capable of obtaining the objective and providing the advantages herein before stated, it is to be understood that it is merely illustrative of the presently preferred embodiments of the invention and that no limitations are intended to the details of construction or design herein shown other than as described in the appended claims.

What is claimed is:

1. A method for an online subscription system that protects privacy of customer data from the online subscription service merchant comprising the steps of:

a. identifying each subscription service for digital content stored in a data server by a service code of the online subscription merchant;
  b. enabling connecting a wireless device of a customer to a central system for enabling initiating and canceling a subscription service;
  c. enabling entering into the wireless device, the service code, a desired password, and a personal number, and sending this data to the central system;
  d. connecting by the central system to the online subscription merchant system, sending the service code, the desired password and a payment approval notification received from a payment approval network; and
  e. receiving from the merchant system an activated password, and storing the activated password in the central system for retrieving subsequently by the customer the activated password for accessing the online subscription service, without divulging customer identity data to the online subscription merchant system.

2. The method as in claim 1, further comprising the steps of:
   a. pre-storing customer data in the central system that includes customer identification data and a plurality of bankcard data;
   b. pre-storing data of the subscription merchant in the central system including a service code for each service, the code including a merchant number that identifies the merchant to the central system and a subscription service number that identifies each subscription service by its duration terms and corresponding subscription prices;
   c. using the personal number by the central system, identifying the customer and retrieving the customer bankcard data, identifying the merchant by the merchant number and identifying the specific service and its prices by the subscription service number and creating a subscription billing record in the central system with this data;
   d. the central systems creating a payment approval record and sending to an existing payment approval network and receiving the payment approval notification.

3. The method as in claim 2, further comprising the steps of:
   setting up an account in the central system by the customer using an account set up data card from the central system.

4. The method as in claim 2, further comprising the steps of:
   setting up a merchant account in the central system by providing at least the service code data.

5. The method as in claim 1, further comprising the steps of:
   a. the merchant system activating the subscription service for the customer by activating the desired password and sending to the central system the notification of service activation and the activated password;
   b. the central system storing the activated password in a subscription billing record;
   c. enabling the customer connecting to the central system, displaying a retrieval card from the central system and retrieving the activated password for enabling the customer connecting to the merchant system over the Internet and by using the activated password receiving the subscription service.

6. The method as in claim 1, further comprising the steps of:
   a. enabling the customer subsequently connecting to the central system, displaying the canceling subscription card from the central system and canceling the service;
   b. the central system sending a cancellation notification to the merchant and updating a subscription billing record to stop creating periodic payment to the merchant from the customer.

7. An online subscription system that protects privacy of customer data from an online subscription service merchant comprising:
   a central system that mediates delivery of a password to the customer to access a subscription service for digital content stored in a data server from an online subscription merchant system, delivers an activated password to the central system, the customer connects to the central system and retrieves the activated password, thereby accesses the subscription service, without divulging the identity of the customer, including name and e-mail address to the online subscription service merchant.

8. The online subscription system as in claim 7, further comprising:
   a. the central system mediates delivery of a customer desired password from the customer to the online subscription service merchant; and
   b. then the central system mediates delivery of an activated password based on the desired password from the online subscription service merchant to the customer enabling the customer to receive the service from the subscription merchant, without divulging the identity of the customer, including name and e-mail address to the subscription merchant.

9. The online subscription system as in claim 7, further comprising:
   the central system mediates from a group of, a one time trial subscription payment or periodic payments to the online subscription service merchant from the customer, to access the subscription service, without divulging the identity of the customer, including name, bankcard data, and e-mail address to the online subscription service merchant.

10. The online subscription system as in claim 9, further comprising:
    the central system mediates cancellation of a trial subscription service payment, to the online subscription service merchant from the customer without divulging the identity of the customer, including name and e-mail address to the online subscription service merchant.

11. The online subscription system as in claim 9, further comprising:
    the central system mediates a cancellation of a periodic subscription service to the online subscription service merchant from the customer without divulging the identity of the customer, including name and e-mail address to the online subscription service merchant.

12. An online subscription system that protects privacy of customer data from the online subscription merchant comprising:
    a. a web page of the online subscription merchant, the web page identifies each subscription service for digital content stored in a data server by a service code;
    b. a wireless device connection to the central system that displays data cards by the central system on the device, these cards enabling initiation and cancellation of a subscription service;
    c. the device enables entry into the initiation of service data card displayed on the wireless device, the service code, a desired password, and a personal number, and sending of this data to the central system;
    d. the central system connects to the merchant system, sends the service code, the desired password and a payment approval notification, and receives from the merchant system an activated password, and stores the activated password in the central system for subsequent retrieval of the activated password for accessing the subscription service, without divulging customer identity data to the merchant system.

13. The system as in claim 12, further comprising:
    a. a central computer system that pre-stores customer data, that includes customer identification data and a plurality of bankcard data;

b. the central system pre-stores data of a subscription merchant including a service code for each service, the code including a merchant number that identifies the merchant to the central system and subscription service numbers that identify different subscription services along with subscription prices and duration terms;

c. the central system uses the personal number to identify the customer and retrieves the customer bankcard data, identifies the merchant by the merchant number and identifies the specific service and its prices by the subscription service number and creates a subscription billing record in the central system with this data;

d. the central system creates a payment approval record and sends to an existing payment approval network and receives the payment approval notification.

14. The system as in claim 13, further comprising:
set up of an account in the central system by the customer using an account set up data card from the central system.

15. The system as in claim 13, further comprising:
set up of a merchant account in the central system by providing at least the service code data.

16. The system as in claim 12, further comprising:
a. the merchant system activates the service by activating the desired password and sends to the central system the notification of service activation and the activated password;
b. the central system stores the activated password in a subscription billing record;
c: the customer connects to the central system, displays a retrieval card from the central system and retrieves the activated password;
d. the customer connects to the merchant system over the Internet and uses the activated password and receives the subscription service.

17. The system as in claim 12, further comprising the steps of:
a. the customer subsequently connects to the central system, displays the subscription cancellation card from the central system and cancels the service;
b. the central system sends a cancellation notification to the merchant and updates the subscription billing record to stop creating periodic payment to the merchant from the customer.

* * * * *